(12) United States Patent
Gissing et al.

(10) Patent No.: US 11,323,449 B2
(45) Date of Patent: May 3, 2022

(54) UNIFIED ACCESSIBILITY SETTINGS FOR INTELLIGENT WORKSPACE PLATFORMS

(71) Applicant: Citrix Systems, Inc., Fort Lauderdale, FL (US)

(72) Inventors: Christopher Leslie Gissing, Cambridge (GB); Ellen Rose Wootten, Bury St. Edmunds (GB); Daniel Alan Robert Peacock, Cambridge (GB); Roderick William Alexander Munro, Cambridge (GB); Heather Sarah Avril Talbot, Cambridge (GB); Martynas Markevicius, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 287 days.

(21) Appl. No.: 16/455,027

(22) Filed: Jun. 27, 2019

(65) Prior Publication Data
US 2020/0412727 A1    Dec. 31, 2020

(51) Int. Cl.
*G06F 9/451* (2018.01)
*H04L 29/06* (2006.01)

(52) U.S. Cl.
CPC ............ *H04L 63/102* (2013.01); *G06F 9/452* (2018.02)

(58) Field of Classification Search
CPC ....... H04L 63/102; G06F 9/452; G06F 9/451; G06F 9/44505
See application file for complete search history.

(56) References Cited

U.S. PATENT DOCUMENTS

| | | | | |
|---|---|---|---|---|
| 7,325,014 | B1 * | 1/2008 | Kennedy | G06F 16/958 |
| 7,554,522 | B2 * | 6/2009 | Sinclair, II | G06F 3/0481 |
| | | | | 345/156 |
| 9,207,703 | B1 * | 12/2015 | Kancharla | G06F 1/00 |
| 10,490,099 | B2 * | 11/2019 | Zavesky | H04N 21/25883 |
| 2001/0034841 | A1 * | 10/2001 | Shambroom | H04L 63/0442 |
| | | | | 726/10 |
| 2002/0152255 | A1 | 10/2002 | Smith et al. | |

(Continued)

FOREIGN PATENT DOCUMENTS

| | | | | |
|---|---|---|---|---|
| JP | 2006178966 A | * | 7/2006 | ........... G06F 3/0481 |
| WO | WO-2016/210195 A1 | | 12/2016 | |

OTHER PUBLICATIONS

Method and Apparatus for Profile Sensitive Mobile Device Behavior for Visually Impaired Users, Dec. 17, 2014, 4 pages (Year: 2014).*
International Search Report and Written Opinion on International Appl. No. PCT/US2020/039263 dated Oct. 6, 2020.
International Preliminary Report on Patentability on PCT Appl. No. PCT/US2020/039263 dated Jan. 6, 2022.

*Primary Examiner* — Yongjia Pan
(74) *Attorney, Agent, or Firm* — Foley & Lardner LLP

(57) ABSTRACT

Described embodiments provide systems and methods for providing cross-application adaptive services. A computing system may receive, from a first client device, an identification of an user access requirement. The computing system may retrieve, from a requirement-adaptive service database, a system configuration corresponding to the user access requirement. The computing system may configure a hosted application according to the retrieved system configuration. The computing system may provide, to the first client device for rendering by an application of the first client device, the configured hosted application.

33 Claims, 10 Drawing Sheets

(56) References Cited

U.S. PATENT DOCUMENTS

| | | | |
|---|---|---|---|
| 2003/0046401 A1* | 3/2003 | Abbott | G06F 9/451 709/228 |
| 2003/0195950 A1* | 10/2003 | Huang | G06F 16/9535 709/219 |
| 2005/0128192 A1* | 6/2005 | Heintzman | G09G 5/00 345/207 |
| 2006/0085748 A1 | 4/2006 | Luther et al. | |
| 2007/0282912 A1* | 12/2007 | Reiner | G16H 10/20 |
| 2008/0079750 A1* | 4/2008 | Setlur | G06F 3/14 345/593 |
| 2009/0043840 A1* | 2/2009 | Cherukuri | H04L 41/00 709/203 |
| 2011/0082938 A1* | 4/2011 | Jaudon | G06F 9/451 709/227 |
| 2011/0153781 A1* | 6/2011 | Srinivas | G06F 3/04842 709/219 |
| 2012/0297041 A1* | 11/2012 | Momchilov | H04L 41/0813 709/223 |
| 2014/0282285 A1* | 9/2014 | Sadhvani | G06F 8/38 715/865 |
| 2015/0212680 A1* | 7/2015 | Dunne | G06F 3/0484 715/746 |
| 2015/0319252 A1* | 11/2015 | Momchilov | H04L 67/141 709/223 |
| 2016/0147544 A1* | 5/2016 | Kaplan | G06F 21/45 715/712 |
| 2017/0269916 A1* | 9/2017 | Singhal | G06F 9/46 |
| 2019/0121633 A1* | 4/2019 | Chen | G06F 16/9574 |

* cited by examiner

UNIFIED ACCESSIBILITY SETTINGS FOR INTELLIGENT WORKSPACE PLATFORMS

FIELD OF THE DISCLOSURE

The present application generally relates to communications, including but not limited to systems and methods for network resource monitoring.

BACKGROUND

People with disabilities or visual impairments are finding that they sometimes have accessibility difficulties at work. Scope, a UK disability charity have completed a survey which found employer attitudes can have 'major or some' negative impact on the day-to-day lives of employees with disabilities (68% of survey participants, sample 1,509 people). Therefore, it is very important for employers to make the working environment as inclusive as possible and to make user on-boarding within the company as seamless as possible.

Currently with workspace platforms, administrators or users have to configure separate settings for each of their apps. This may be laborious and difficult, at best requiring specialized knowledge of the platform, and at worst, may be impossible for users (for example, a visually impaired user may not be able to see well enough to navigate small text dialog boxes or menus to find a setting to increase text size). Furthermore, with network provided services, such as web applications, virtual machines, hosted desktops or other hosted resources, or other such services, users may not have access to the adaptive settings required. For example, a user may configure their own computing device according to adaptive settings, but upon connection to a remote desktop or virtual desktop, the user may have to reconfigure the remote desktop operating system. This may be tedious or impossible, as noted above. Furthermore, with many hosted applications or virtual applications, settings may be lost after each session, requiring frequent reconfiguration.

SUMMARY

This Summary is provided to introduce a selection of concepts in a simplified form that are further described below in the Detailed Description. This Summary is not intended to identify key features or essential features, nor is it intended to limit the scope of the claims included herewith.

To address issues with adaptive configuration of hosted resources, an intelligent workspace platform and centralized policy control may be used to retrieve, maintain, and translate and apply adaptive settings to such resources, regardless of execution location (e.g. at a virtual machine, within a secure browser of a client device, on a remote desktop, etc.) and regardless of the accessing device. Such implementations provide centralized management of access settings across a user's entire workspace, inclusive of Software-as-a-Service (SaaS) or web applications, and mobile and desktop applications; provide the ability to provide a suitable computing environment for any user, irrespective of application or user impairment/access need; and provide these features in a flexible environment, available for management by end user self-service or administrator control.

In one aspect, the present disclosure is directed to a method for providing cross-application adaptive services. The method includes receiving, by a computing system from a first client device, an identification of an user access requirement. The method also includes retrieving, by the computing system from a requirement-adaptive service database, a system configuration corresponding to the user access requirement. The method also includes configuring, by the computing system, a hosted application according to the retrieved system configuration. The method also includes providing, by the computing system to the first client device for rendering by an application of the first client device, the configured hosted application.

In some implementations, the method includes establishing a connection, by the computing system, with a second client device associated with the user; and retrieving, by the computing system from the second client device associated with the user, an adaptive configuration set by the user corresponding to the user access requirement. In some implementations, the method includes determining an identity of the user and retrieving, from an identity storage device, an identification of the user access requirement corresponding to the identity of the user. In some implementations, the first client device lacks a system configuration corresponding to the user access requirement. In a further implementation, the first client device has a second system configuration incompatible with the user access requirement.

In some implementations, the application of the first client device is a remote desktop application. In a further implementation, the method includes configuring an operating system of a remote desktop according to the retrieved system configuration.

In some implementations, the application of the first client device is a web browser and the hosted application comprises a web application executed by an application server. In a further implementation, the method includes transmitting a command, by the computing system to the first client device, to cause the first client device to instantiate a secure virtual browser, the retrieved system configuration applied to the secure virtual browser.

In some implementations, the method includes receiving, by the computing system from the first client device, a request to access a second hosted application; configuring, by the computing system, the second hosted application according to the retrieved system configuration; and providing, by the computing system to the first client device for rendering by the application of the first client device, the configured second hosted application. The hosted application and second hosted application may be different types of applications.

In another aspect, the present disclosure is directed to a system for providing cross-application adaptive services. The system includes a computing system comprising a memory device storing a requirement-adaptive service database, a network interface in communication with a first client device, and a processor configured to: receive, via the network interface from the first client device, an identification of an user access requirement; retrieve, from the requirement-adaptive service database, a system configuration corresponding to the user access requirement; configure a hosted application according to the retrieved system configuration; and provide, via the network interface to the first client device for rendering by an application of the first client device, the configured hosted application.

In some implementations, the processor is further configured to: establish a connection, via the network interface, with a second client device associated with the user; and retrieve, from the second client device associated with the user, an adaptive configuration set by the user corresponding to the user access requirement. In some implementations, the processor is further configured to determine an identity of the user and retrieve, from an identity storage device, an identification of the user access requirement corresponding to the identity of the user. In some implementations, the first client device lacks a system configuration corresponding to the user access requirement. In a further implementation, the first client device has a second system configuration incompatible with the user access requirement.

In some implementations, the application of the first client device is a remote desktop application. In a further implementation, the processor is further configured to configure an operating system of a remote desktop according to the retrieved system configuration. In some implementations, the application of the first client device is a web browser and the hosted application comprises a web application executed by an application server. In a further implementation, the processor is further configured to transmit a command, via the network interface to the first client device, to cause the first client device to instantiate a secure virtual browser, the retrieved system configuration applied to the secure virtual browser.

In some implementations, the processor is further configured to: receive, from the first client device, a request to access a second hosted application; configure the second hosted application according to the retrieved system configuration; and provide, via the network interface to the first client device for rendering by the application of the first client device, the configured second hosted application. The hosted application and second hosted application may be different types of applications.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for unified accessibility settings for intelligent workspace platforms.

A. Network and Computing Environment

Figure 1A:
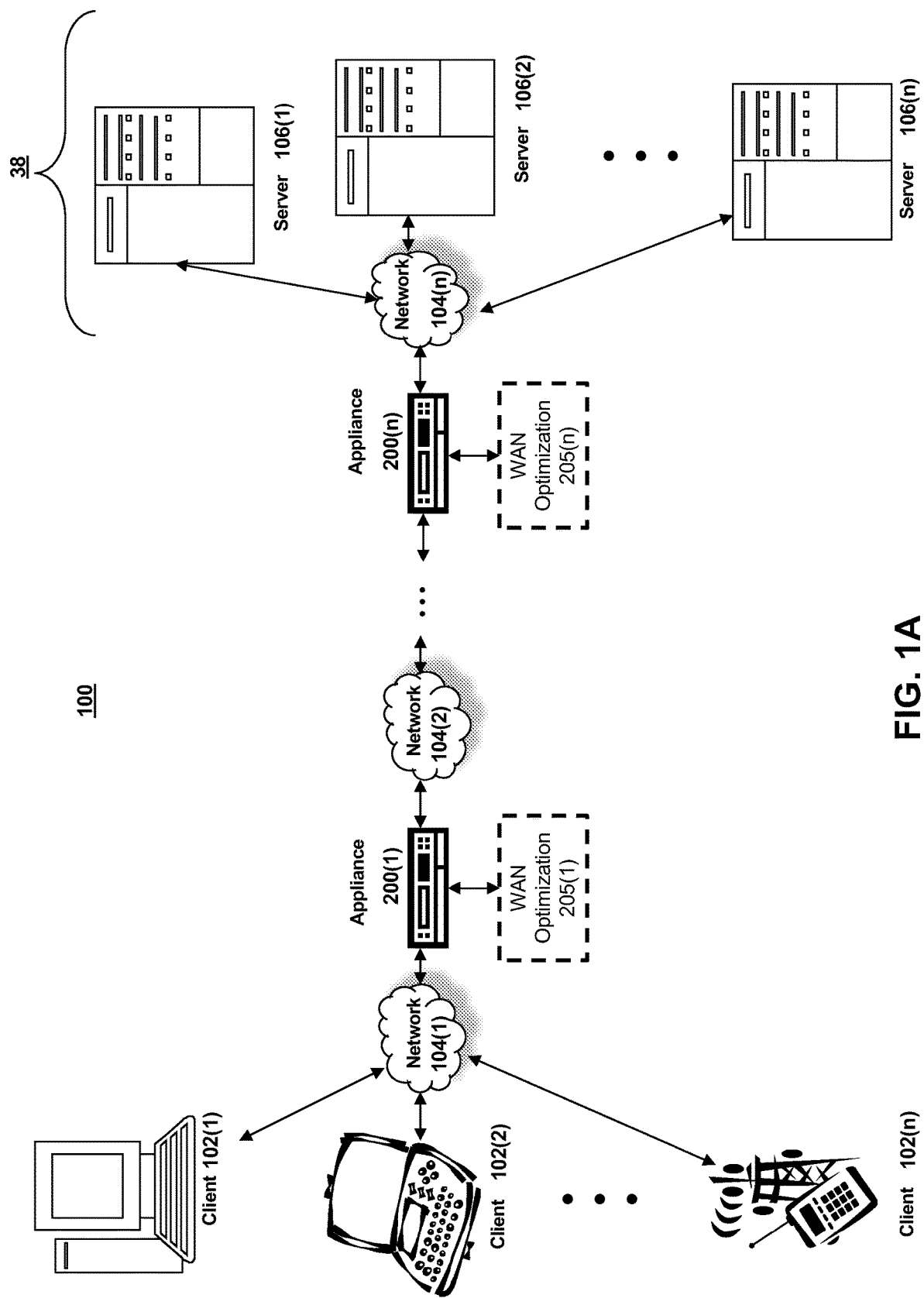
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104.

For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
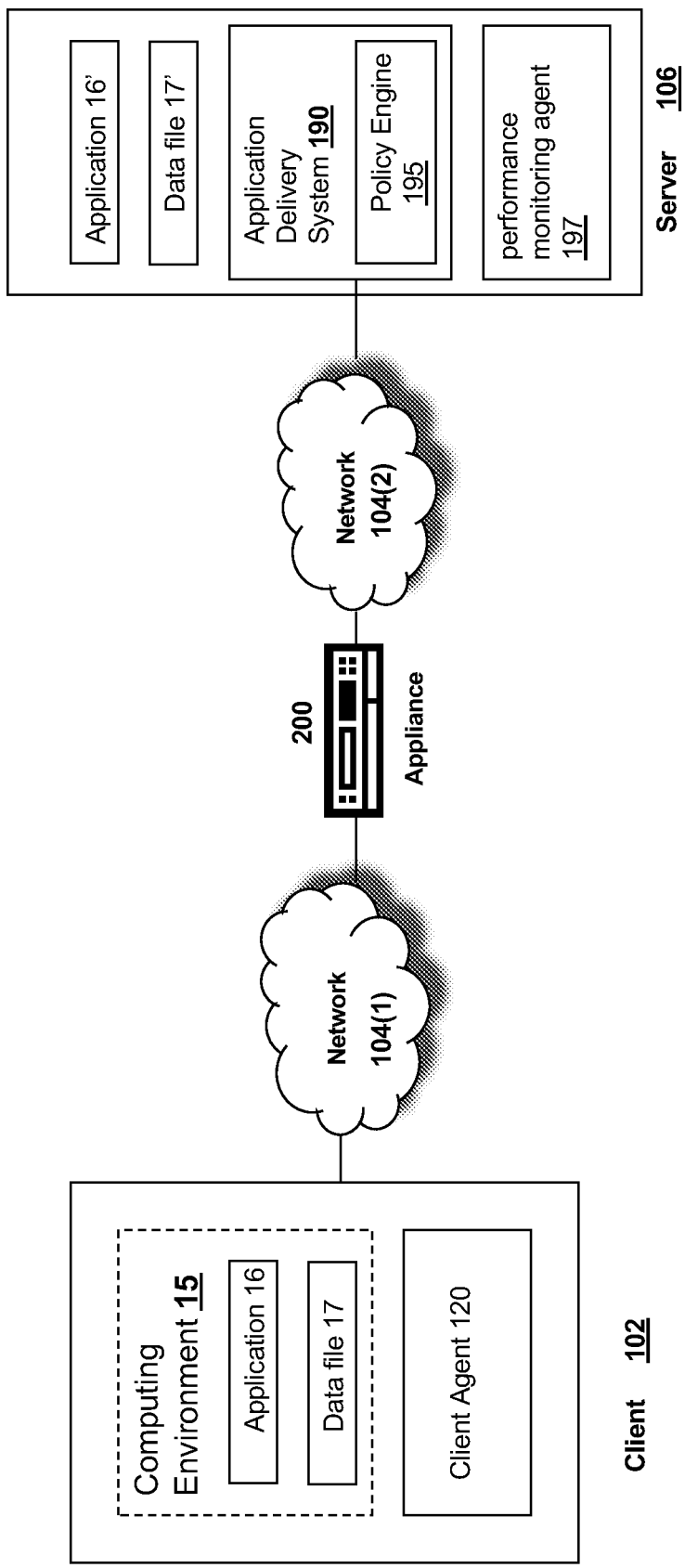
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
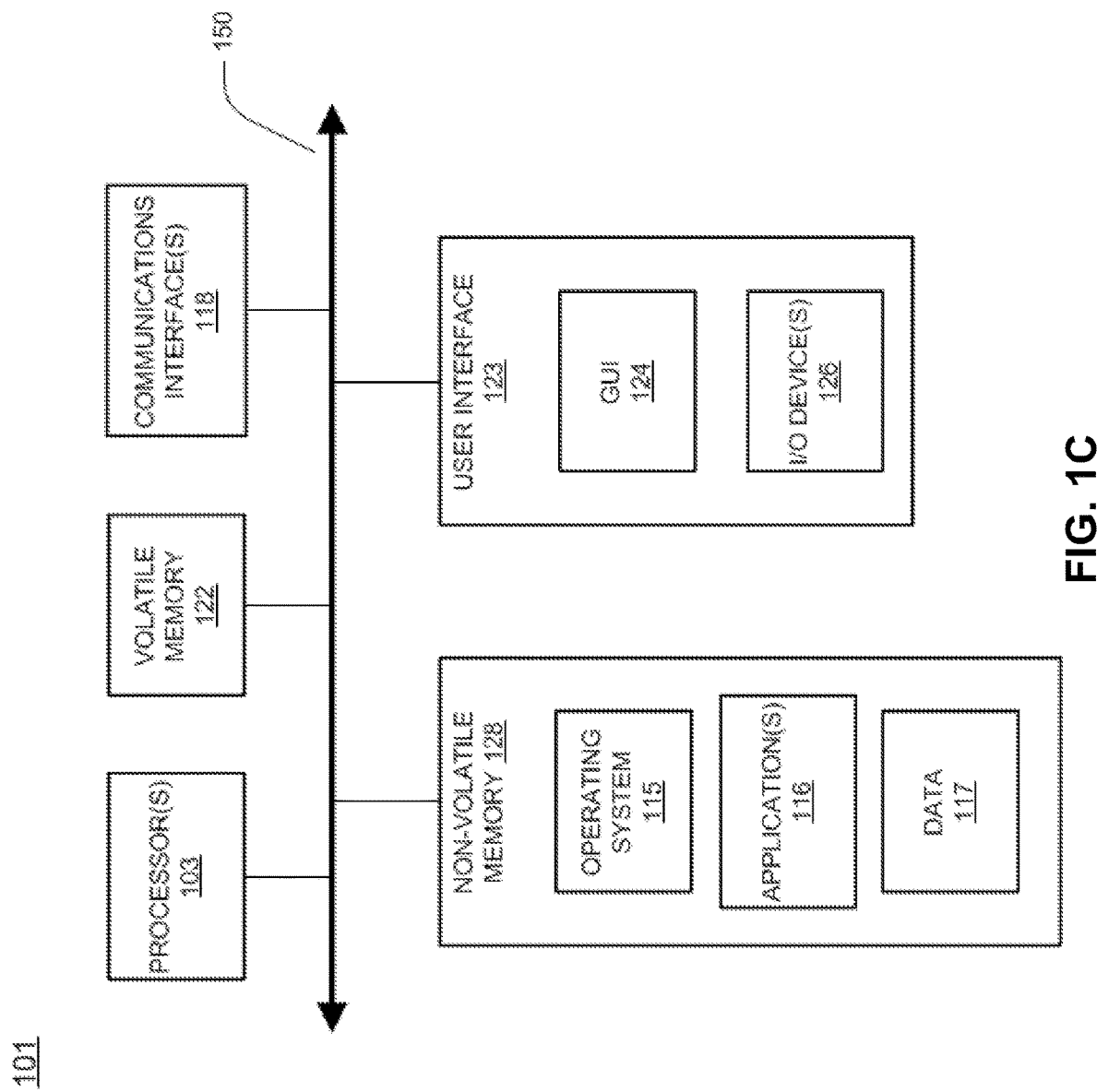
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
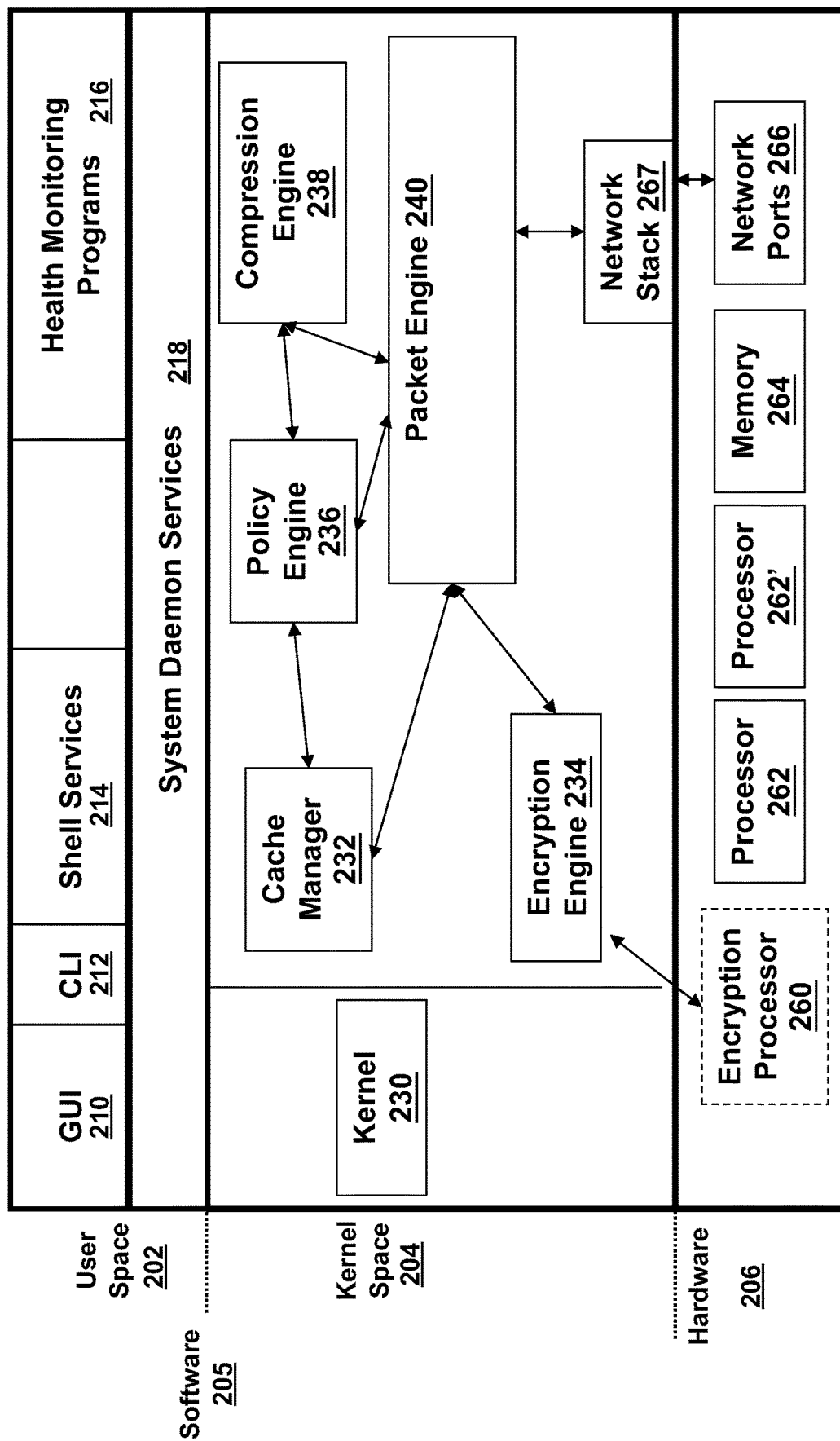
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
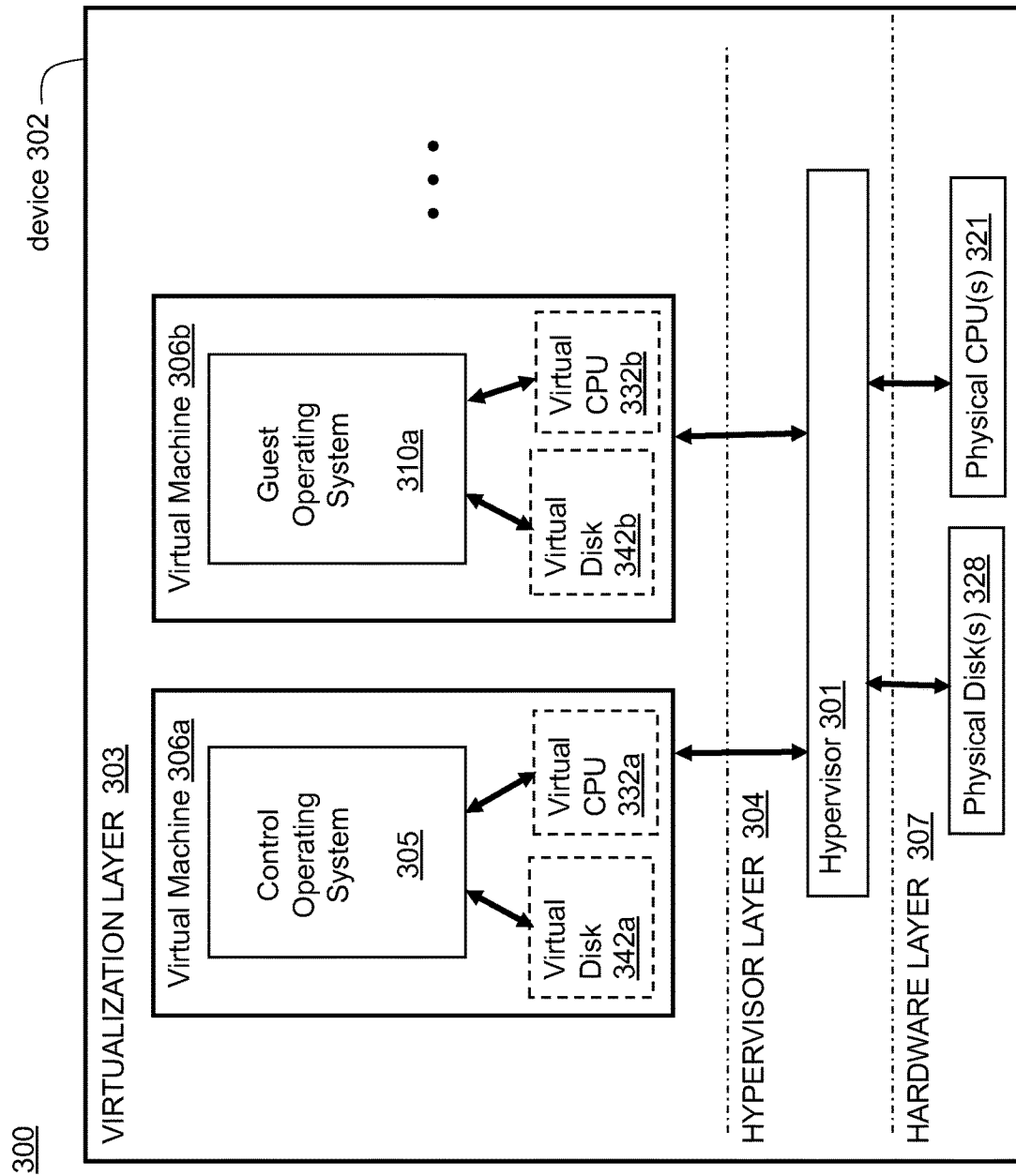
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
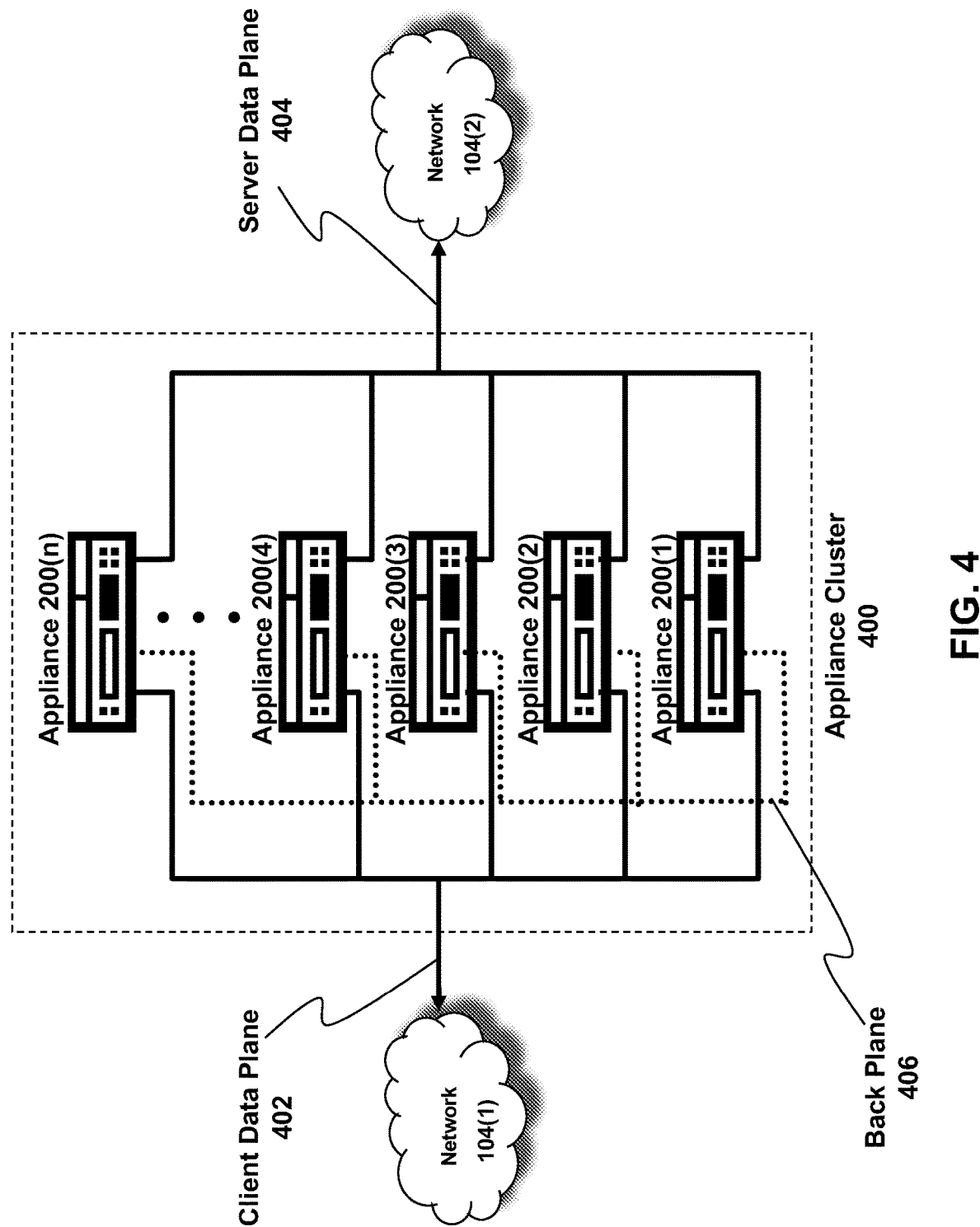
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. API Dependency Error and Latency Injection

In implementations of computing systems not utilizing the systems and methods described herein, administrators or users have to configure separate settings for each of their apps. This may be laborious and difficult, at best requiring specialized knowledge of the platform, and at worst, may be impossible for users (for example, a visually impaired user may not be able to see well enough to navigate small text dialog boxes or menus to find a setting to increase text size). Furthermore, with network provided services, such as web applications, virtual machines, hosted desktops or other hosted resources, or other such services, users may not have access to the adaptive settings required. For example, a user may configure their own computing device according to adaptive settings, but upon connection to a remote desktop or virtual desktop, the user may have to reconfigure the remote desktop operating system. This may be tedious or impossible, as noted above. Furthermore, with many hosted applications or virtual applications, settings may be lost after each session, requiring frequent reconfiguration.

To address issues with adaptive configuration of hosted resources, an intelligent workspace platform and centralized policy control may be used to retrieve, maintain, and translate and apply adaptive settings to such resources, regardless of execution location (e.g. at a virtual machine, within a secure browser of a client device, on a remote desktop, etc.) and regardless of the accessing device. Such implementations provide centralized management of access settings across a user's entire workspace, inclusive of Software-as-a-Service (SaaS) or web applications, and mobile and desktop applications; provide the ability to provide a suitable computing environment for any user, irrespective of application or user impairment/access need; and provide these features in a flexible environment, available for management by end user self-service or administrator control.

The systems and methods discussed herein provide for centralizing configuration. In some implementations, user accessibility needs are saved in a database; the system may also maintain how access requirements are configured per type of service.

In a first example of how this centralized configuration works, Sam, a user, starts working at an organization. Sam declares that they have protanopia (red-green color blindness). A system administrator can then set color blind-friendly settings for the applications that Sam will encounter in their day-to-day work in one single place.

Additionally, centralization of this policy being applied means user self-service is feasible; if a user requires a larger font size across their computing platform, they could change this themselves, regardless of whether applications are executed locally or remotely, whether provided as SaaS or web applications, or via a remote desktop or other hosted environment. In this example, the user would see increased font size on their workspace, including mobile apps, web apps and windows apps; all changed from a single action.

Continuing with the example above, after starting at the organization, Sam finds that they are using 3 different endpoints on a regular basis: a personal mobile device (preconfigured for accessibility by Sam); a work PC (configured by the organization); and a public PC such as a PC at a local library that is not configurable by Sam or the organization.

Each of these endpoints need to be treated in a different way, without losing the continuity between environments. For example, Sam regularly uses two different apps, one is a virtual windows app and the other a browser-based SaaS application. When launching the applications from different endpoints different logic decisions will occur, as follows.

In a first implementation, Sam wants to connect to SaaS application through a workspace user interface on Sam's personal mobile device. On launch of the SaaS application a Centralized Policy Controller makes decisions based on the combination of application type, endpoint device, and Sam's needs. Since the endpoint device is preconfigured (for Sam's needs—protanopia) and the app is web based, no action is required to adapt the app for Sam's needs as it is already covered by the endpoint device configuration.

In a second implementation, Sam then needs to connect to the hosted virtual application from the same device. The Centralized Policy Controller recognizes that any virtual application requires policy settings to be applied on Sam's remote profile. The Centralized Policy Controller queries a Service Configuration Store database to retrieve information for applying protanopia (the user need, identified through a User Data Store API) policy settings to the virtual machine. Policies are then applied on the remote desktop profile of the virtual machine. The virtual application launches, with the new policies applied, and Sam can do work without manually reconfiguring the remote operating system.

In a third implementation, Sam wants to connect to a SaaS application through the workspace user interface on a public library machine. This endpoint device is not configured for Sam's needs, nor can it be by Sam or the organization (while a library administrator could theoretically reconfigure the machine for Sam, this is likely to be unusual or difficult in practice). Since the application is web based but Sam does not control the end point, unlike the first implementation above, the Centralized Policy Controller finds from the Service Configuration Store that the application needs to be launched in a Secure Virtual Browser. The Centralized Policy Controller finds from the User Data Store that Sam needs protanopia filters applied. The app launches in a Secure Virtual Browser, with protanopia settings applied to the Virtual Browser Tab. Sam can do work at the library, with accessibility settings applied.

Figure 5A:
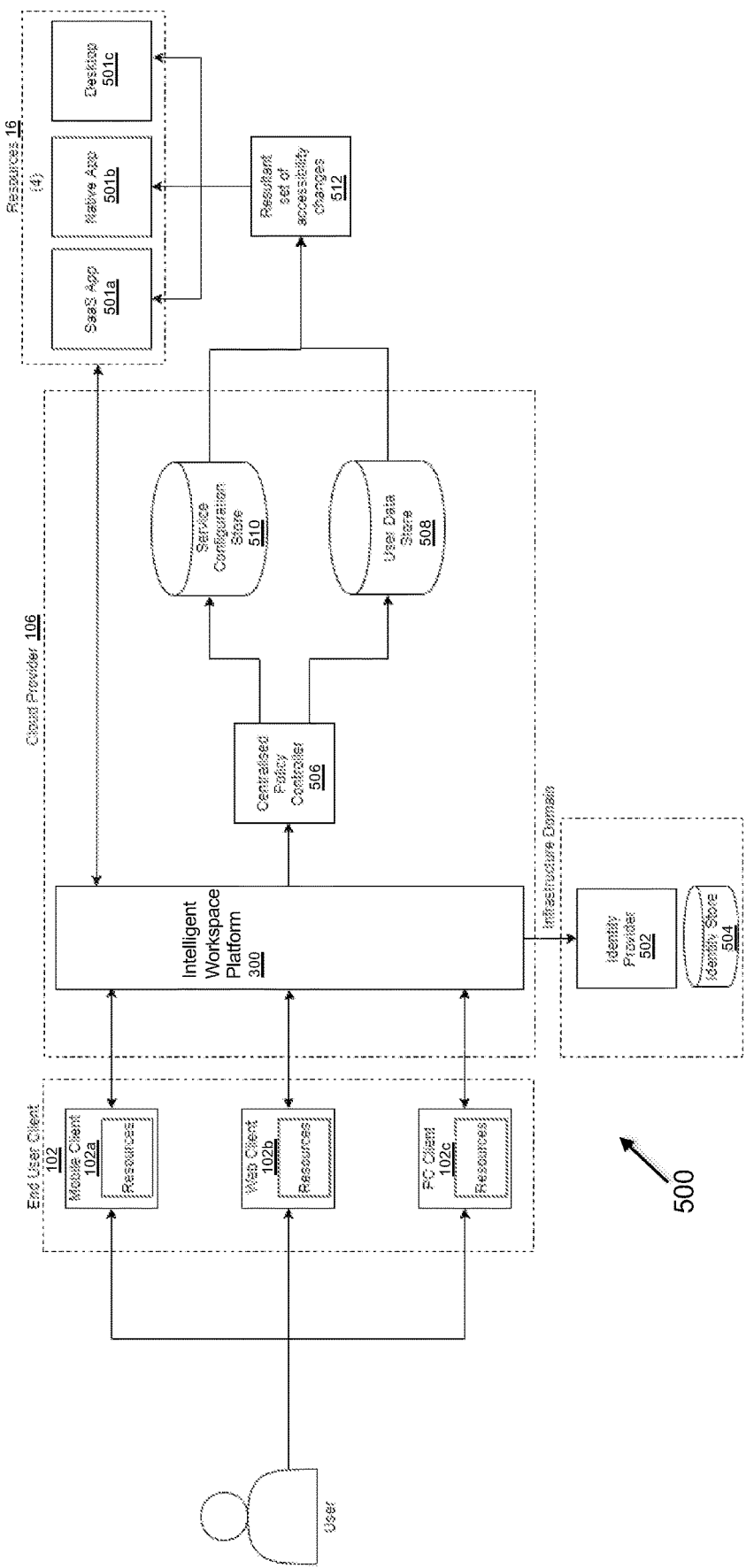
FIG. 5A is a block diagram of an implementation of a system for providing unified accessibility settings.

FIG. 5A is a block diagram of an implementation of a system 500 for providing unified accessibility settings. A range of end user devices, such as web/mobile/PC clients (102a-102c in the diagram) are used to access desktops, native applications, and SaaS applications (501a-501c in the diagram) via the Intelligent Workspace Platform 300. At the point of which a user logs in, the Intelligent Workspace Platform 300 contacts the Centralized Policy Controller (506) which in turn queries the User Data Store (508), a database maintained by the centralized policy controller, for a user's accessibility preferences, and the Service Configuration Store (510), to retrieve the corresponding configuration to the accessibility preferences. This information is collated by the centralized policy controller, and in the case of a login event, the configuration is made to the Intelligent Workspace Platform. In the case of a resource launch, the User Data Store and Service Configuration Store information is collated and passed to hosted resources, or third-party SaaS providers to apply the configurations. The Service Configuration Store (510) contains multiple methods of configuring a resource for each type of client (e.g. in-application settings, registry keys, preference file scripts, etc.). The Service Configuration Store can also hold templates, which are commonly used profiles of accessibility requirements. For example, the Service Configuration Store will hold protanopia templates for the different range of apps that are supported, when a user selects that they have this need, these templates will be applied. Entries in the Service Configuration Store could be crowd-sourced, where the community can write their own transforms or translations for different applications.

The Intelligent Workspace Platform (300) can also be used by the end user to modify the preferences. In such implementations, the changes are passed to the Centralized Policy Controller (506) which updates the User Data Store (508) and either modifies an existing configuration entry, or requests that a new one be added.

The Service Configuration Store (510) may also be used to hold configurations pertaining to a SaaS virtual browser, in the event that configurations cannot be passed to the third party SaaS provider. In this scenario, a hosted virtual browser will be launched with the applied configurations (512) and will act as a modified viewport to the SaaS app (501a).

Figure 5B:
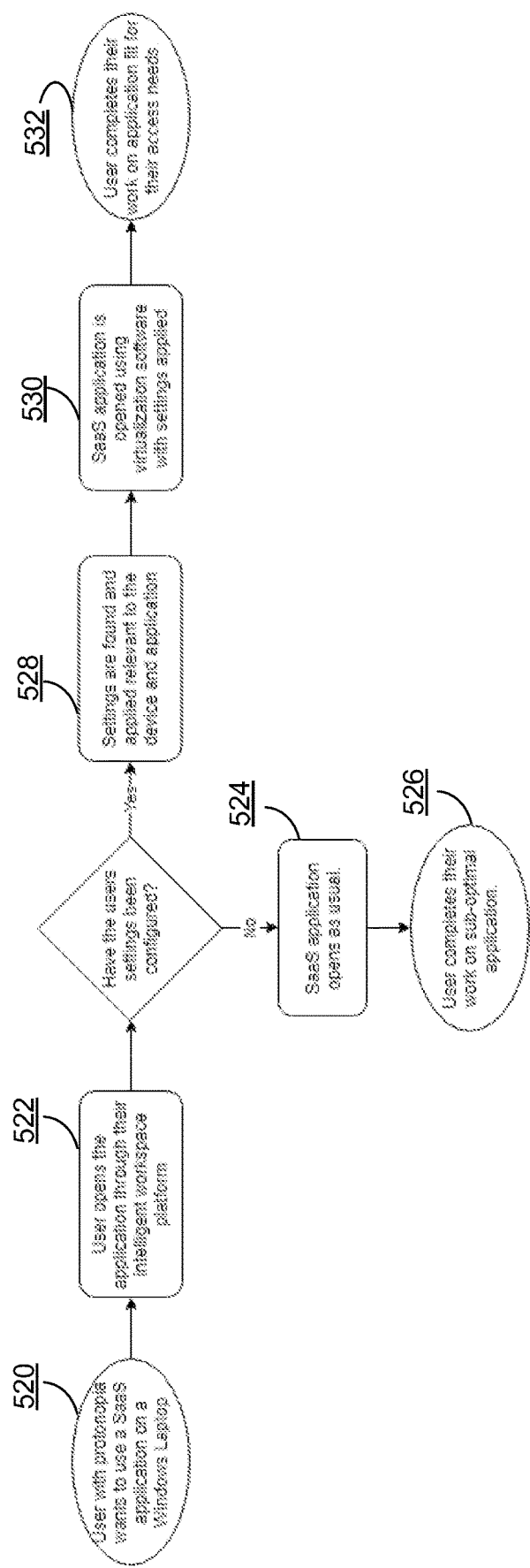
FIG. 5B is a flow diagram of an example method for providing unified accessibility settings, according to some implementations.

FIG. 5B is a flow diagram of an example method for providing unified accessibility settings, according to some implementations. At step 520, a user with an impairment or accessibility issue such as protanopia wants to access a SaaS application from a user laptop, such as a Windows laptop. At step 522, the user opens the SaaS application via an intelligent workspace client application. If the user's settings have not been configured, then at step 524, the SaaS application opens as usual, and at step 526, the user may access the application, albeit with sub-optimal settings.

Conversely, if the user's settings have been configured, then at step 528, a centralized policy controller may find the relevant settings in the user data store and/or service configuration store, and generate a set of accessibility changes. At step 530, the settings may be applied to the SaaS application, and the application launched via virtualization software. At step 532, the user may complete their work on the application, in an optimally configured environment.

Figure 5C:
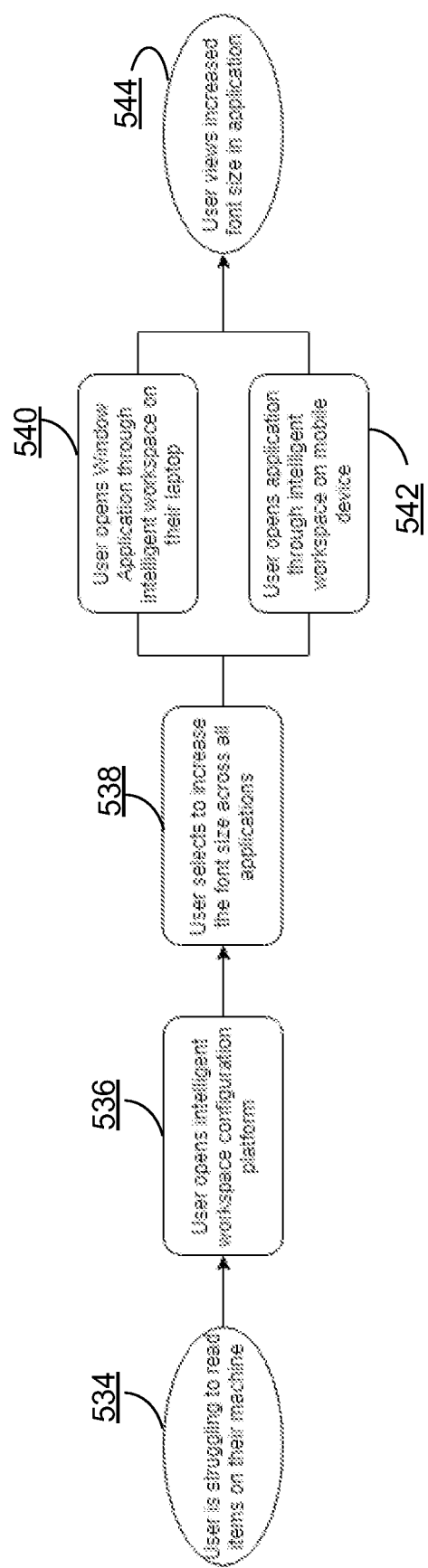
FIG. 5C is another flow diagram of an example method for providing unified accessibility settings, according to some implementations.

FIG. 5C is another flow diagram of an example method for providing unified accessibility settings, according to some implementations. At step 534, a user with an impairment or accessibility issue, such as nearsightedness, may be having trouble reading text on their client device. At step 536, the user may open a workspace configuration platform, which may comprise a local application, or a web application provided by, for example, a centralized policy controller as discussed above. At step 538, the user may direct the workspace configuration platform to increase font sizes across all applications. The centralized policy controller may record the preference in a user data store associated with the user account for later retrieval during configuration of hosted resources.

At step 540, the user may open a hosted application such as a remote desktop or other such application on their device; or conversely, at step 542, the user may utilize a second device, such as a mobile device, to open a hosted application. Regardless of device, the centralized policy controller may retrieve the user preference from the user data store and determine, based on the client device type (e.g. laptop or mobile device, for example) and the application (e.g. remote desktop or web application), a set of accessibility changes to apply to the corresponding application (e.g. changing a registry setting in an operating system of the remote desktop, or increasing a font size within a dynamically generated web page of a web application). At step 544, the user may utilize the application with the accessibility changes automatically applied.

Accordingly, via the implementations discussed above, the user's preferences may be applied regardless of device and regardless of application.

Figure 5D:
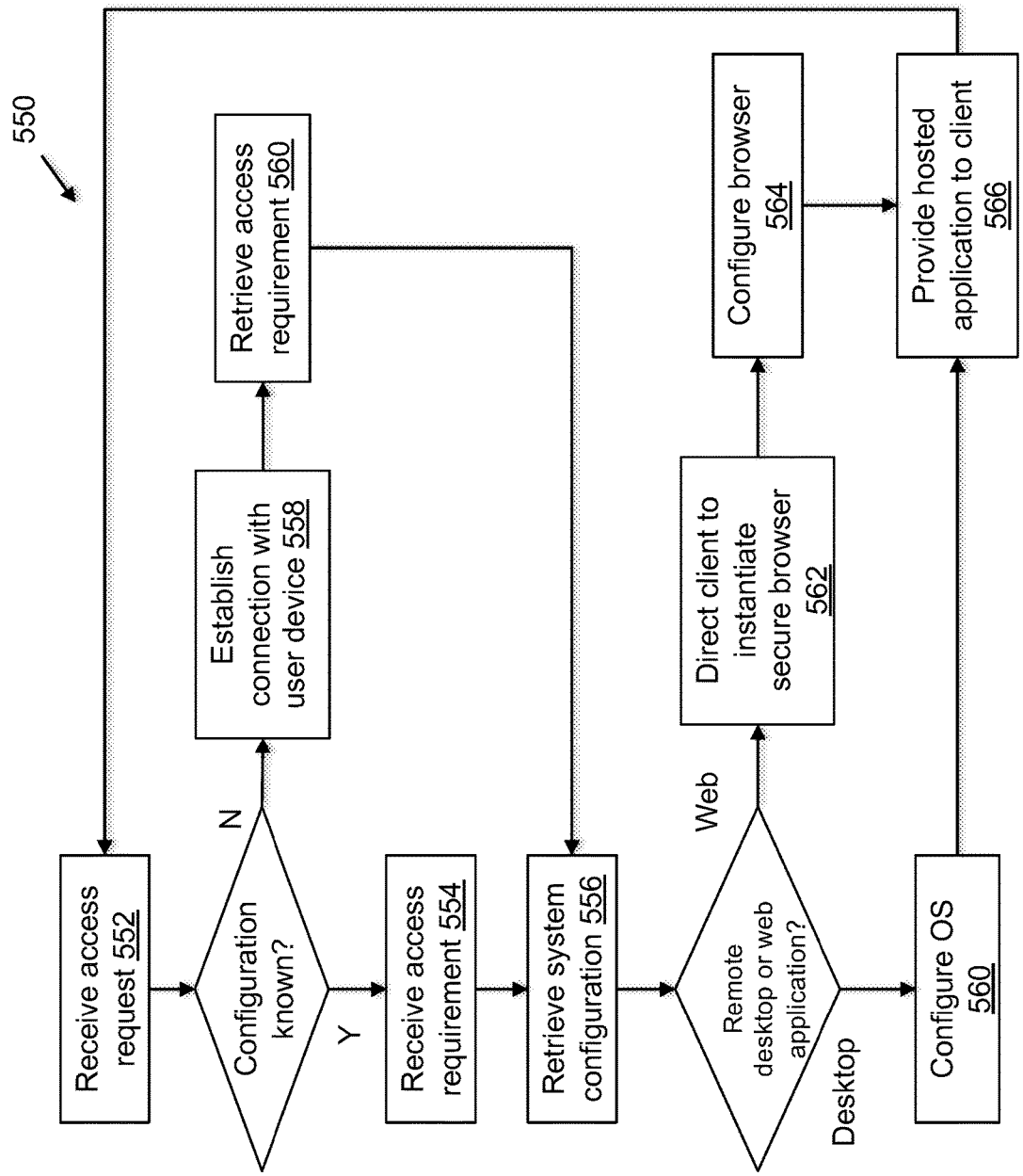
FIG. 5D is another flow diagram of a method for providing unified accessibility settings, according to some implementations.

FIG. 5D is another flow diagram of a method 550 for providing unified accessibility settings, according to some implementations. At step 552, a device, such as a centralized policy controller, may receive an identification of a user access requirement. The identification may comprise an identification of device type or system of the user, and/or a hosted application or other resource to be accessed by the user. The identification may be received via an intelligent workspace platform provided by the same or a different computing device, and may be received responsive to authentication of the user, e.g. via an identity provider system.

The centralized policy controller or other device may query a user data store database to determine whether an access requirement has been previously received and/or stored for the user. If so, then at step 554, the centralized policy controller may retrieve the access requirement from the database, and at step 556, may retrieve a corresponding system configuration for the device type or system of the user, resource to be accessed, and access requirement from a service configuration store, as discussed above.

If an access requirement is not stored in the user data store, at step 558, the centralized policy controller may establish a connection with the user device or another device of the user (e.g. a mobile device of the user, a desktop or laptop computer of the user, etc.). The user device may be configured by the user with an adaptive configuration set corresponding to access requirements of the user (e.g. font sizes, color selections, speech-to-text or speech commands, or other accessibility features). The centralized policy controller may retrieve an identification of the adaptive configuration set at step 560, and may, in some implementations, store the configuration set in a service configuration store and/or user data store. The method may then proceed with step 556 as discussed above.

If the user access requirement indicates that the user is accessing a remote or hosted virtual desktop, then at step 560, the centralized policy controller may configure an operating system of the virtual desktop. Configuring the operating system may comprise applying registry changes, modifying preference files or other configuration files, modifying a screen resolution, activating speech commands, or performing other such functions, according to the retrieved system or service configuration. The accessibility changes may thus be applied to the virtual desktop, and at step 566, the workspace platform may provide the remote or hosted virtual desktop to the client device for access, configured to enable the user to work optimally.

If the user access requirement indicates that the user is accessing a web application, for example, if the user access requirement indicates that the user is on a public terminal or otherwise cannot or should not access a remote desktop or download files to a local machine, then at step 562, the workspace platform may direct a browser application on the client device to instantiate a secure browser session. The secure browser session may provide encryption, sandboxing of memory, and other features to prevent access from other applications or an operating system of the client device to the web application. As the user may be unable to configure the client device in some implementations, at step 564, the centralized policy controller may apply the accessibility changes or system configuration within the web application, such as by increasing font sizes, limiting or changing colors, increasing a view size, activating a speech command function, or performing other such accessibility changes. These changes may occur within the secure browser session on the client device, and/or may occur on the application server providing access to the web application (e.g. by modifying a web page during dynamic generation of the web page by the application server).

Accordingly, the systems and methods discussed herein enable adaptive configuration of hosted resources, an intelligent workspace platform and centralized policy control may be used to retrieve, maintain, and translate and apply adaptive settings to such resources, regardless of execution location (e.g. at a virtual machine, within a secure browser of a client device, on a remote desktop, etc.) and regardless of the accessing device. Such implementations provide centralized management of access settings across a user's entire workspace, inclusive of Software-as-a-Service (SaaS) or web applications, and mobile and desktop applications; provide the ability to provide a suitable computing environment for any user, irrespective of application or user impairment/access need; and provide these features in a flexible environment, available for management by end user self-service or administrator control.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for providing cross-application adaptive services, comprising:

receiving, by a computing system from a first client device, an identification of a first user access requirement by determining an identity of the user and retrieving, from an identity storage device, an identification of the first user access requirement corresponding to the identity of the user;

retrieving, by the computing system from a requirement-adaptive service database, a system configuration corresponding to the user access requirement;

determining, by the computing system, the first client device lacks permission to set a system configuration on the first client device;

responsive to the determination, retrieving, by the computing system, the system configuration from a third client device associated with the user;

configuring, by the computing system, a browser of the first client device to render a hosted application according to the retrieved system configuration, the browser to prevent access to the hosted application by other applications or an operating system of the first client device; and providing, by the computing system, a command to the first client device to initiate execution of the browser to render the configured hosted application.

2. The method of claim 1, wherein receiving the identification of the user access requirement further comprises:

establishing a connection, by the computing system, with a second client device associated with the user; and retrieving, by the computing system from the second client device associated with the user, an adaptive configuration set by the user corresponding to the user access requirement.

3. The method of claim 1, wherein the first client device has a second system configuration incompatible with the user access requirement.

4. The method of claim 1, wherein the application of the first client device is a remote desktop application.

5. The method of claim 4, wherein configuring the hosted application further comprises configuring an operating system of a remote desktop according to the retrieved system configuration.

6. The method of claim 1, wherein the application of the first client device is a web browser and the hosted application comprises a web application executed by an application server.

7. The method of claim 1, further comprising:

receiving, by the computing system from the first client device, a request to access a second hosted application;

configuring, by the computing system, the second hosted application according to the retrieved system configuration; and providing, by the computing system to the first client device for rendering by the application of the first client device, the configured second hosted application;

wherein the hosted application and second hosted application are different types of applications.

8. A system for providing cross-application adaptive services, comprising:

a computing system comprising a memory device storing a requirement-adaptive service database, a network interface in communication with a first client device, and a processor configured to:

receive, via the network interface from the first client device, an identification of a user access requirement corresponding to an identity of a user;

retrieve, from the requirement-adaptive service database, a system configuration corresponding to the user access requirement;

determine the user lacks permission to set a system configuration on the first client device:

responsive to the determination, retrieve the system configuration from a third client device associated with the user;

configure a browser of the first client device to render a hosted application according to the retrieved system configuration, the browser to prevent access to the hosted application by other applications or an operating system of the first client device; and provide, via the network interface, a command to the first client device to initiate execution of the browser to render the configured hosted application.

9. The system of claim 8, wherein the processor is further configured to:

establish a connection, via the network interface, with a second client device associated with the user; and retrieve, from the second client device associated with the user, an adaptive configuration set by the user corresponding to the user access requirement.

10. The system of claim 8, wherein the processor is further configured to determine an identity of the user and retrieve, from an identity storage device, an identification of the user access requirement corresponding to the identity of the user.

11. The system of claim 8, wherein the first client device has a second system configuration incompatible with the user access requirement.

12. The system of claim 8, wherein the application of the first client device is a remote desktop application.

13. The system of claim 12, wherein the processor is further configured to configure an operating system of a remote desktop according to the retrieved system configuration.

14. The system of claim 8, wherein the application of the first client device is a web browser and the hosted application comprises a web application executed by an application server.

15. The system of claim 8, wherein the processor is further configured to:

receive, from the first client device, a request to access a second hosted application;

configure the second hosted application according to the retrieved system configuration; and provide, via the network interface to the first client device for rendering by the application of the first client device, the configured second hosted application;

wherein the hosted application and second hosted application are different types of applications.

16. A non-transitory computer readable medium comprising instructions that, when executed by one or more processors of a computing device, cause the one or more processors to:

receive, from a first client device, an identification of a user access requirement corresponding to an identity of a user;

retrieve, from a requirement-adaptive service database, a system configuration corresponding to the user access requirement;

determine the user lacks permission to set a system configuration on the first client device;

responsive to the determination, retrieve the system configuration from a third client device associated with the user;

configure a browser of the first client device to render a hosted application according to the retrieved system configuration, the browser to prevent access to the hosted application by other applications or an operating system of the first client device; and provide a command to the first client device to initiate execution of the browser to render the configured hosted application.

17. A method, comprising: receiving, by a computing system from a first client device, an identification of a first user access requirement corresponding to an identity of a user;

retrieving, by the computing system from a database, a system configuration corresponding to the user access requirement;

determining, by the computing system, the first client device lacks the system configuration corresponding to the user access requirement;

responsive to the determination, retrieving, by the computing system, the system configuration from a second client device associated with the user that has the system configuration;

configuring, by the computing system, a browser of the first client device to render a hosted application according to the retrieved system configuration, the browser to prevent access to the hosted application by other applications or an operating system of the first client device; and providing, by the computing system, a command to the first client device to initiate execution of the browser to render the configured hosted application.

18. The method of claim 17, wherein receiving the identification of the user access requirement further comprises:

establishing a connection, by the computing system, with a second client device associated with the user; and retrieving, by the computing system from the second client device associated with the user, an adaptive configuration set by the user corresponding to the user access requirement.

19. The method of claim 17, wherein receiving the identification of the user access requirement further comprises determining an identity of the user and retrieving, from an identity storage device, an identification of the user access requirement corresponding to the identity of the user.

20. The method of claim 17, wherein the first client device has a second system configuration incompatible with the user access requirement.

21. The method of claim 17, wherein the application of the first client device is a remote desktop application.

22. The method of claim 21, wherein configuring the hosted application further comprises configuring an operating system of a remote desktop according to the retrieved system configuration.

23. The method of claim 17, wherein the application of the first client device is a web browser and the hosted application comprises a web application executed by an application server.

24. The method of claim 17, further comprising:

receiving, by the computing system from the first client device, a request to access a second hosted application;

configuring, by the computing system, the second hosted application according to the retrieved system configuration; and providing, by the computing system to the first client device for rendering by the application of the first client device, the configured second hosted application;

wherein the hosted application and second hosted application are different types of applications.

25. A system, comprising:

a computing system comprising a memory device storing a database, a network interface in communication with a first client device, and a processor configured to:

receive, via the network interface from the first client device, an identification of a user access requirement corresponding to an identity of a user;

retrieve, from the requirement-adaptive service database, a system configuration corresponding to the user access requirement;

determine the first client device lacks the system configuration corresponding to the user access requirement;

responsive to the determination, retrieve the system configuration from a second client device associated with the user that has the system configuration;

configure a browser of the first client device to render a hosted application according to the retrieved system configuration, the browser to prevent access to the hosted application by other applications or an operating system of the first client device; and provide, via the network interface, a command to the first client device to initiate execution of the browser to render the configured hosted application.

26. The system of claim 25, wherein the processor is further configured to:

establish a connection, via the network interface, with a second client device associated with the user; and retrieve, from the second client device associated with the user, an adaptive configuration set by the user corresponding to the user access requirement.

27. The system of claim 25, wherein the processor is further configured to determine an identity of the user and retrieve, from an identity storage device, an identification of the user access requirement corresponding to the identity of the user.

28. The system of claim 25, wherein the first client device has a second system configuration incompatible with the user access requirement.

29. The system of claim 25, wherein the application of the first client device is a remote desktop application.

30. The system of claim 29, wherein the processor is further configured to configure an operating system of a remote desktop according to the retrieved system configuration.

31. The system of claim 25, wherein the application of the first client device is a web browser and the hosted application comprises a web application executed by an application server.

32. The system of claim 25, wherein the processor is further configured to:

receive, from the first client device, a request to access a second hosted application;

configure the second hosted application according to the retrieved system configuration; and provide, via the network interface to the first client device for rendering by the application of the first client device, the configured second hosted application;

wherein the hosted application and second hosted application are different types of applications.

33. A non-transitory computer readable medium comprising instructions that, when executed by one or more processors of a computing device, cause the one or more processors to:

receive, from a first client device, an identification of a user access requirement corresponding to an identity of a user;

retrieve, from a requirement-adaptive service database, a system configuration corresponding to the user access requirement;

determine the first client device lacks the system configuration corresponding to the user access requirement;

responsive to the determination, retrieve the system configuration from a second client device associated with the user that has the system configuration;

configure a browser of the first client device to render a hosted application according to the retrieved system configuration, the browser to prevent access to the hosted application by other applications or an operating system of the first client device; and provide a command to the first client device to initiate execution of the browser to render the configured hosted application.

* * * * *